United States Patent
Braig et al.

(10) Patent No.: US 10,711,896 B2
(45) Date of Patent: Jul. 14, 2020

(54) PISTON FOR AN INTERNAL COMBUSTION ENGINE

(71) Applicant: Mahle International GmbH, Stuttgart (DE)

(72) Inventors: Ralf Braig, Schorndorf (DE); Dieter Emmrich, Waiblingen (DE); Eric Erbs, Muttersholtz (FR); Rainer Fischer, Stuttgart (DE); Thomas Hettich, Markgroeningen (DE); Artem Walter, Winterbach (DE); Markus A. Hirsch, Stuttgart (DE)

(73) Assignee: Mahle International GmbH (DE)

( * ) Notice: Subject to any disclaimer, the term of this patent is extended or adjusted under 35 U.S.C. 154(b) by 143 days.

(21) Appl. No.: 15/761,086

(22) PCT Filed: Sep. 8, 2016

(86) PCT No.: PCT/EP2016/071155
§ 371 (c)(1),
(2) Date: Mar. 16, 2018

(87) PCT Pub. No.: WO2017/045991
PCT Pub. Date: Mar. 23, 2017

(65) Prior Publication Data
US 2018/0266557 A1    Sep. 20, 2018

(30) Foreign Application Priority Data
Sep. 18, 2015   (DE) .................. 10 2015 217 911

(51) Int. Cl.
*F16J 1/16*      (2006.01)
*F02F 3/02*      (2006.01)
*F02F 3/00*      (2006.01)

(52) U.S. Cl.
CPC ............... *F16J 1/16* (2013.01); *F02F 3/00* (2013.01); *F02F 3/02* (2013.01)

(58) Field of Classification Search
CPC .............. F16J 1/16; F02F 3/02; F02F 3/00
See application file for complete search history.

(56) References Cited

U.S. PATENT DOCUMENTS

| 4,274,372 A | 6/1981 | Kelm et al. |
| 4,683,808 A | 8/1987 | Wacker et al. |

(Continued)

FOREIGN PATENT DOCUMENTS

| DE | 3425965 A1 | 1/1986 |
| DE | 102006013905 A1 | 9/2007 |

(Continued)

OTHER PUBLICATIONS

English abstract for DE-102008018850.

(Continued)

*Primary Examiner* — Hung Q Nguyen
(74) *Attorney, Agent, or Firm* — Fishman Stewart PLLC

(57) ABSTRACT

A piston for an internal combustion engine may include a piston skirt extending in a piston longitudinal direction and defined in the piston longitudinal direction by a piston head. The piston skirt may include a boxed interior space defined by two box walls and two substantially opposing skirt walls. A boss having a through-opening may be arranged on each of the two box walls, the two through-openings being oriented so that they align with one another. The two box walls may each include a boss portion oriented perpendicularly to the boss, and at least one intermediate portion extending between the respective boss portion and one of the skirt walls. The intermediate portion may merge via a bend into the associated boss portion. A radial extent of the boss (Continued)

portion may be greater than a diameter of the through-opening and at least 50% of a diameter of the piston.

18 Claims, 2 Drawing Sheets

(56) References Cited

U.S. PATENT DOCUMENTS

| | | | | |
|---|---|---|---|---|
| 5,076,225 | A * | 12/1991 | Tokoro | F02F 3/00 |
| | | | | 123/193.1 |
| 5,331,932 | A * | 7/1994 | Watanabe | F02F 3/027 |
| | | | | 123/193.6 |
| 5,562,074 | A * | 10/1996 | Koch | F02F 3/0076 |
| | | | | 123/193.6 |
| 6,357,341 | B1 * | 3/2002 | Watanabe | F02F 3/00 |
| | | | | 123/193.6 |
| 6,659,063 | B2 * | 12/2003 | Nomura | F02F 3/00 |
| | | | | 123/193.6 |
| 6,862,977 | B2 * | 3/2005 | Glinsner | F02F 3/0076 |
| | | | | 92/208 |
| 8,220,432 | B2 * | 7/2012 | Iwata | F02F 3/02 |
| | | | | 123/193.6 |
| 8,286,606 | B2 * | 10/2012 | Breidenbach | F02F 3/0084 |
| | | | | 123/193.6 |
| 8,601,994 | B2 * | 12/2013 | Mukouhara | B23P 15/10 |
| | | | | 123/193.1 |
| 8,720,405 | B2 * | 5/2014 | Golya | F02F 3/02 |
| | | | | 123/193.4 |
| 8,752,521 | B2 * | 6/2014 | Braig | F02F 3/02 |
| | | | | 123/193.6 |
| 9,291,120 | B2 * | 3/2016 | Matsuo | F02F 3/0015 |
| 10,184,421 | B2 * | 1/2019 | Brandt | F02F 3/0076 |
| 2007/0235003 | A1 * | 10/2007 | Cagney | B22F 5/008 |
| | | | | 123/279 |
| 2009/0056534 | A1 | 3/2009 | Scharp | |
| 2010/0229820 | A1 * | 9/2010 | Iwata | F02F 3/00 |
| | | | | 123/193.6 |
| 2011/0073061 | A1 | 3/2011 | Chae et al. | |
| 2011/0139114 | A1 * | 6/2011 | Nakazawa | F02F 3/027 |
| | | | | 123/193.6 |
| 2011/0174153 | A1 * | 7/2011 | Hettich | F02F 3/0076 |
| | | | | 92/172 |
| 2013/0276740 | A1 * | 10/2013 | Wandrie, III | F02F 3/22 |
| | | | | 123/193.6 |
| 2015/0027401 | A1 | 1/2015 | Gniesmer | |

FOREIGN PATENT DOCUMENTS

| | | |
|---|---|---|
| DE | 102008018850 A1 | 6/2009 |
| DE | 102011085448 A1 | 5/2013 |
| EP | 0009269 A1 | 4/1980 |
| EP | 0171825 A1 | 2/1986 |
| EP | 0385390 A1 | 9/1990 |
| JP | 2002-317692 A | 10/2002 |
| JP | 2003-083159 A | 3/2003 |
| JP | 2003-161204 A | 6/2003 |
| JP | 2004-176573 A | 6/2004 |
| WO | 2009153088 A1 | 12/2009 |

OTHER PUBLICATIONS

English abstract for JP-2002-317692.
English abstract for JP-2003-083159.
English abstract for EP-01714825.
English abstract for JP-2003161204.

* cited by examiner

PISTON FOR AN INTERNAL COMBUSTION ENGINE

CROSS-REFERENCE TO RELATED APPLICATIONS

This application claims priority to International Patent Application No. PCT/EP2016/071155, filed on Sep. 8, 2016, and German Patent Application No. DE 10 2015 217 911.7, filed on Sep. 18, 2015, the contents of both of which are incorporated herein by reference in their entireties.

TECHNICAL FIELD

The invention relates to a piston for an internal combustion engine.

BACKGROUND

The term piston in the context of internal combustion engines denotes a moving component, which together with a fixed component, the so-called cylinder, forms a closed combustion chamber, the volume of which can be varied through movement of the piston in the cylinder. For driving a crankshaft of the internal combustion engine, the crankshaft is connected to the piston by way of a connecting rod. Such a coupling of the connecting rod can be done by means of a piston pin, which is received by a piston-pin boss formed in the piston.

DE 34 25 965 A1 discloses a piston of the generic type for an internal combustion engine having a piston skirt which extends in a piston longitudinal direction and is defined in a piston longitudinal direction by a piston head. Here a boxed interior space, which is defined by two box walls and two substantially opposing skirt walls or skirt wall portions is arranged in the piston skirt. A boss having a through-opening for a piston pin is arranged on each of the two box walls, wherein the two through-openings are oriented so that they align with one another. Here, in the area of the boss, a piston skirt of the known piston, closed at the lower end, is set back from the outer body of the piston, forming a recess on either side of a horizontal piston pin plane, to an extent intended to prevent oil backing up in the recesses.

DE 10 2011 085 448 A1 discloses a further piston, which comprises a piston head having a ring belt and a skirt part, which is arranged on the piston head and comprises at least two load-bearing skirt-wall portions, and wherein the load-bearing skirt-wall portions are connected to one another by at least two obliquely inclined box walls set back in relation to the piston outside diameter. A piston-pin boss is arranged in each box wall to receive a piston pin. The inner face of the piston-pin boss, seen in relation to the piston center, here runs flush with the face of the associated box wall, wherein the box wall has a concave shape in its profile transversely to the direction of the piston-pin boss. This is intended to provide a piston that is lighter in weight but nevertheless inflexible.

One aspect that has proved disadvantageous with all pistons known from the prior art, however, is the noise generated in the operation of the internal combustion engine, caused in particular by the periodic variation in the attitude of the piston in the cylinder liner.

SUMMARY

The present invention addresses the problem of specifying an improved or at least alternative embodiment for a piston of the generic type, which allows quiet operation.

According to the invention this object is achieved by the subject matter of the independent claims. Advantageous embodiments form the subject of the dependent claims.

The present invention is based on the general idea of joining each of two box walls, each carrying a boss for a piston pin, to a skirt wall each by way of at least one bent intermediate portion, so that such a piston on the one hand has an increased elasticity in the pressure-backpressure direction, that is to say from one skirt wall to the other, and on the other possesses a greater inflexibility in a transverse direction to this, particularly with regard to flexing of the piston about the piston pin axis as a result of the gas pressure. The increased elastic flexibility of the skirt walls firstly serves firstly to reduce noise occurring in operation under the variation in the attitude of the piston and at the same time to prevent seizing-up in the event of an overlap of the piston in the cylinder liner. The piston according to the invention here in a known manner comprises a piston skirt extending in a piston longitudinal direction, which is defined in the piston longitudinal direction by a piston head. The piston skirt comprises a boxed interior space, which is at least partially defined by two box walls and two substantially opposing skirt walls. Here a boss having a through-opening for receiving a piston pin is arranged on each of the two box walls, wherein the two through-openings are oriented so that they align with one another. According to the invention the two box walls now each comprise a boss portion oriented perpendicularly to the boss, that is to say to their boss axis, and at least one intermediate portion extending between the boss portion and an associated skirt wall. The intermediate portions here each merge via a bend into the associated boss portion, wherein a radial extent of the boss portion is greater than a boss diameter and at least 50% of the diameter (outside diameter) of the piston. Through intermediate portions formed in this way, which are attached solely to one of the two opposing skirt walls, for example, and which together with the skirt wall form a spring element, it is possible to lend increased elasticity to the piston according to the invention in the pressure-backpressure direction, because the bent box wall opposes only a relatively slight resistance to flexural moments about the bend axis. At the same time, however the angled intermediate portions form angle sections with the boss, which present greater bending stiffness in opposition to flexural moments about substantially transverse axes to the bend axis, particularly about the piston pin axis. This allows the forces resulting from the elevated combustion pressures in modern diesel engines to be reliably transmitted to the bosses by relatively thin box walls and saves fuel due to a reduced piston mass. It has been shown in tests that the advantages only accrue provided that the boss portion is larger than the boss diameter and for this reason at least the one bend is made in the intermediate portion outside the boss.

In an advantageous development of the solution according to the invention the two box walls each comprise a hub portion oriented perpendicularly to the boss, and two intermediate portions extending between the respective boss portion and the two opposing skirt walls. Such box walls therefore lend support for both skirt walls via corresponding intermediate portions on the boss portions of the box walls, thereby giving the piston greater stiffness, particularly in opposition to flexural moments about the piston pin axis.

In an advantageous development of the solution according to the invention a radial extent L of the boss portion is greater than a diameter of a combustion chamber recess of the piston. It has emerged that the combustion chamber recess area is adequately supported by the two boss portions of a narrow box arranged a small distance apart, whilst the stiffening effect of the angle sections formed by the intermediate portions is most pronounced if the bend is arranged outside the recess area, that is to say in the outer area of the piston head provided with a greater thickness of material.

In a further advantageous embodiment of the solution according to the invention a bend angle α between the boss portion and an intermediate portion 10° is ≤α≤20°, preferably approximately 15°. Through such a bend angle, it is possible to achieve the optimum characteristics in terms of elasticity and inflexibility required in the piston according to the invention in order to reduce the noise generated in the operation of the internal combustion engine. Generally speaking, the elasticity of the piston skirt increases in the pressure-backpressure direction with an increasing bend angle α and with increasing length of the intermediate portions.

In a further advantageous embodiment of the solution according to the invention two intermediate portions are spaced a greater or smaller distance apart at the associated skirt wall than at the respective bend, that is to say at the transition to the boss portion. In concrete terms this means that the respective intermediate portions diverge from one another, starting from the respective boss portion, or converge, that is to say taper towards one another in the direction of the associated skirt wall. Intermediate portions which starting from the respective boss portion diverge towards the associated skirt wall have proved particularly advantageous here.

Further important features and advantages of the invention emerge from the dependent claims, from the drawings and from the associated description of the figures, referring to the drawings.

It goes without saying that the features specified above and those still to be explained below can be employed not only in the particular combination indicated but also in other combinations or in isolation without departing from the scope of the present invention.

Preferred exemplary embodiments of the invention are represented in the drawings and are explained in more detail in the following description, the same reference numerals referring to identical or similar or functionally equivalent components.

BRIEF DESCRIPTION OF THE DRAWINGS

Here the respective schematic drawings show.

DETAILED DESCRIPTION

Figure 1:
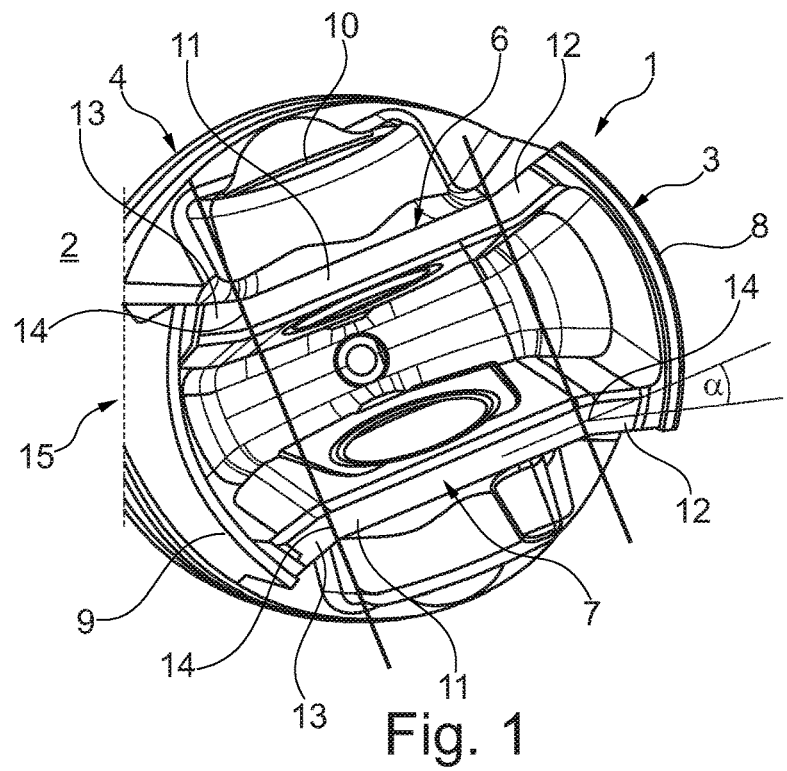
FIG. 1a view of a piston according to the invention from below.
Figure 2:
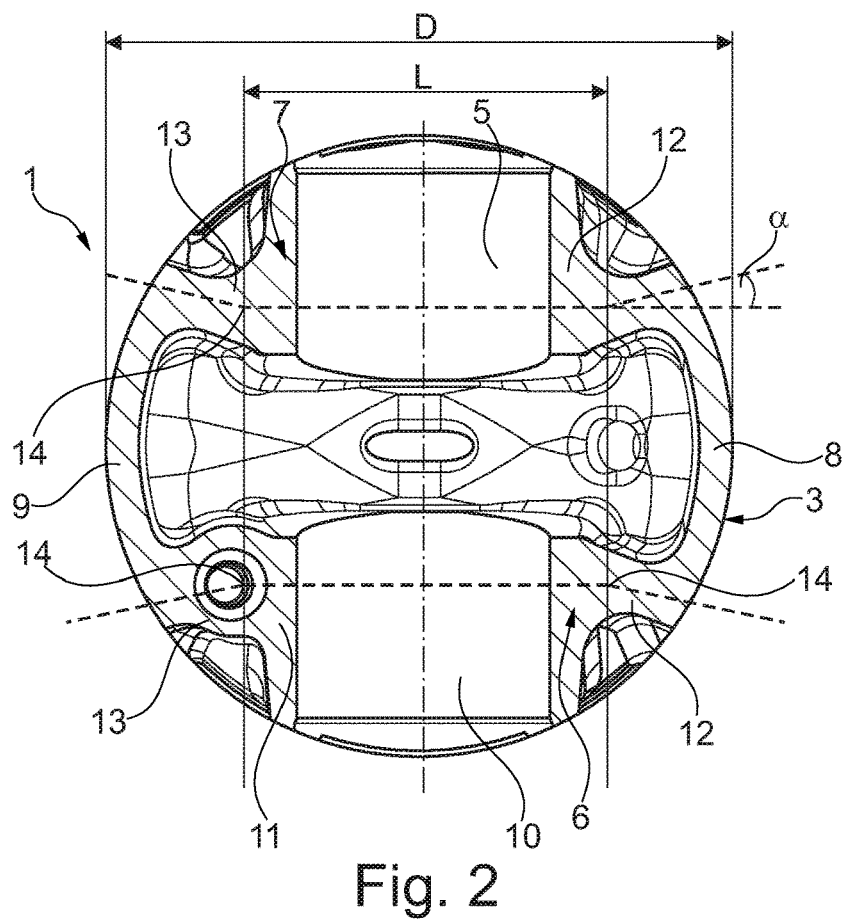
FIG. 2 a sectional representation through the piston according to the invention, FIGS. 3a-3c different embodiments of the piston according to the invention.
Figure 3:
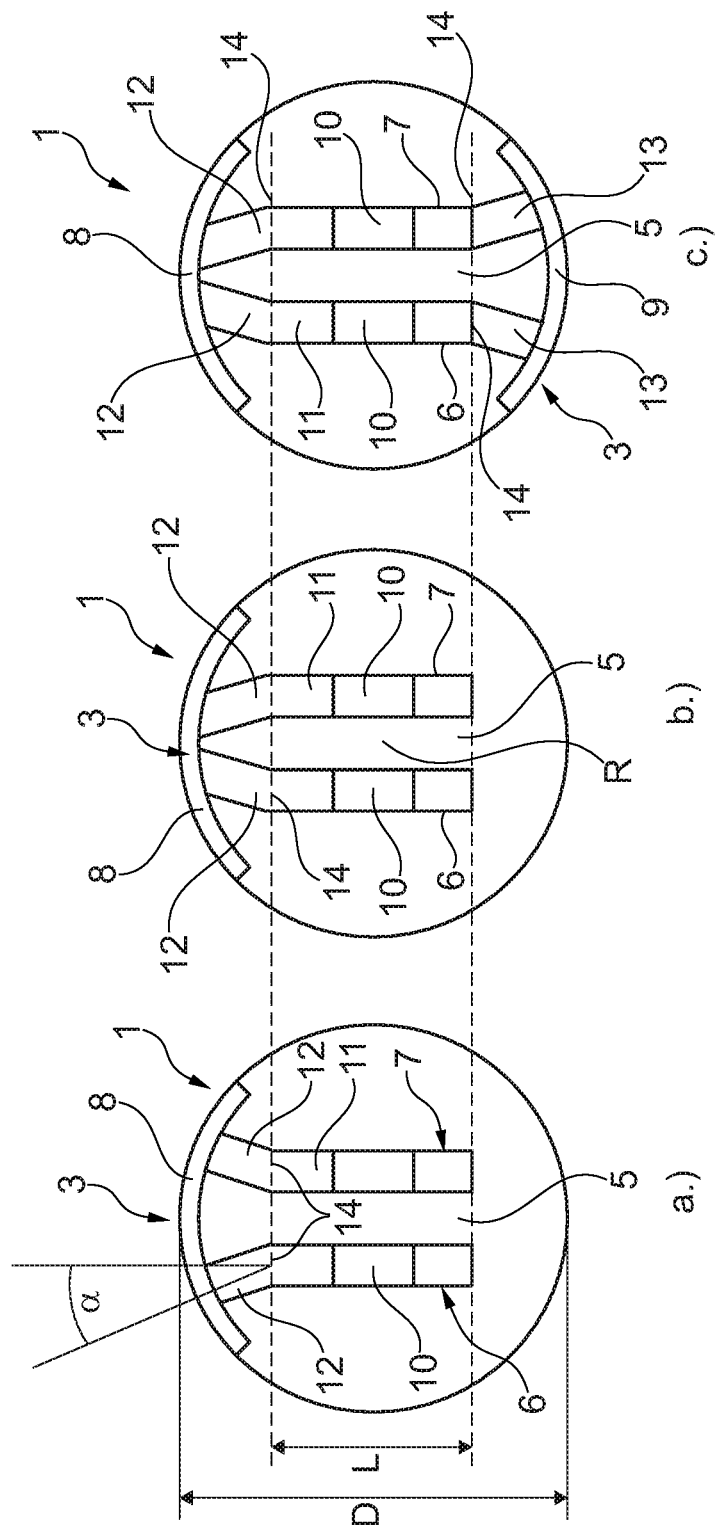

Corresponding to FIGS. 1 to 3, piston 1 according to the invention for an internal combustion engine 2, merely indicated, comprises a piston skirt 3 extending in a piston longitudinal direction R (running perpendicular to the perspective plane in FIGS. 2 and 3), which is defined in a piston longitudinal direction R by a piston head 4. The piston skirt 3 here comprises a boxed interior space 5, which is defined by two box walls 6, 7 and two substantially opposing skirt walls 8, 9. Here a boss having a through-opening 10 of predefined opening diameter for receiving a piston pin (not shown) is arranged on each of the two box walls 6, 7, wherein the through-openings 10 are oriented so that they align with one another. It is essential for the invention here that the two box walls 6, 7 each comprise a boss portion 11 oriented perpendicularly to the boss, and at least one intermediate portion 12, 13 extending between the respective boss portion 11 and the skirt wall 8, 9. The intermediate portions 12, 13 here each merge via a bend 14 into the associated boss portion 11, wherein a radial extent L of the boss portion 11 is greater than a diameter of the through-openings 10 and at least 50% of the diameter D of the piston 1.

Such an embodiment of the piston 1 according to the invention on the one hand serves to increase its elasticity in the pressure-backpressure direction, making it possible to reduce the noise generated and any tendency to seizing-up, particularly in the operation of the internal combustion engine 2. On the other hand, the inflexibility of the piston in opposition not only to flexing about the piston pin axis but also flexing of the pin itself transversely to the axis can be increased.

Widely varying embodiments of the intermediate portions 12, 13 are generally feasible here, so that according to FIG. 3a intermediate portions 12 can be arranged between the boss portion 11 and the associated skirt wall 8 only on one side. Similarly, two intermediate portions 12, 13, which then open into the skirt wall 8 or the skirt wall 9, may obviously also be arranged with a bend on each boss portion 11. At the same time, it is also possible to select different preferred orientations of the intermediate portions 12, 13 relative to the associated boss portion 11 so that, for example, the intermediate portions 12, 13, starting from the bend 14, may diverge outwards (cf. FIGS. 1 to 3a and lower half of FIG. 3c) or starting from the bend 14 they may converge towards the associated skirt wall 8, 9 (cf. top of FIGS. 3b and 3c).

Here a radial extent L of the boss portion 11 is preferably greater than a diameter of a combustion chamber recess 15, so that the bends 14 are situated outside the area of the piston head weakened by the combustion chamber recess 15.

In terms of a bend angle α between the respective boss portion 11 and an adjoining intermediate portion 12, 13, the bend angle α usually lies in a range between 10° and 20°, preferably approximately 15°. Here the sizes of the bend angles on individual bends 14 of the intermediate portions 12, 13 relative to the boss portion 11 may obviously differ.

In an especially preferred embodiment of the solution according to the invention a radial extent L of the boss portion 11 is at least 60%, preferably even at least 70% of the diameter D of the piston 1, thereby further augmenting the advantages in terms of reduced noise emissions accruing from the invention.

With the piston 1 according to the invention and at least one internal combustion engine 2 comprising this piston 1 it is possible to increase the inflexibility of the piston 1 in opposition to flexing under the gas pressure load and also the elasticity in the pressure-backpressure direction.

The invention claimed is:

1. A piston for an internal combustion engine, comprising:
   a piston skirt extending in a piston longitudinal direction and defined in the piston longitudinal direction by a piston head;
   wherein the piston skirt includes a boxed interior space defined by two box walls and two substantially opposing skirt walls;
   wherein a boss having a through-opening is arranged on each of the two box walls, wherein the two through-openings are oriented so that they align with one another;

wherein the two box walls each includes a boss portion oriented perpendicularly to the boss, and at least one intermediate portion extending between the respective boss portion and one of the skirt walls;

wherein the at least one intermediate portion merges via a bend into the associated boss portion;

wherein a radial extent of the boss portion is greater than a diameter of the through-opening and at least 50% of a diameter of the piston; and wherein the radial extent of the boss portion is greater than a diameter of a combustion chamber recess of the piston.

2. The piston as claimed in claim 1, wherein the at least one intermediate portion includes two intermediate portions extending between the respective boss portion and the skirt walls.

3. The piston as claimed in claim 1, wherein the at least one intermediate portion of one of the two box walls and the at least one intermediate portion of the other of the two box walls are spaced a greater distance apart at the associated skirt wall than at the respective bend.

4. The piston as claimed in claim 1, wherein the at least one intermediate portion of one of the two box walls and the at least one intermediate portion of the other of the two box walls are spaced a smaller distance apart at the associated skirt wall than at the respective bend.

5. The piston as claimed in claim 1, wherein a bend angle between the boss portion and an intermediate portion is between 10° and 20°.

6. The piston as claimed in claim 1, wherein a bend angle a between the boss portion and the at least one intermediate portion is approximately 15°.

7. The piston as claimed in claim 1, the radial extent of the boss portion is at least 60% of the diameter of the piston.

8. An internal combustion engine comprising at least one piston having:

a piston skirt extending in a piston longitudinal direction and defined in the piston longitudinal direction by a piston head;

wherein the piston skirt includes a boxed interior space defined by two box walls and two substantially opposing skirt walls;

wherein a boss having a through-opening is arranged on each of the two box walls, wherein the two through-openings are oriented so that they align with one another;

wherein the two box walls each includes a boss portion oriented perpendicularly to the boss, and at least one intermediate portion extending between the respective boss portion and one of the skirt walls;

wherein the at least one intermediate portion merges via a bend into the associated boss portion;

wherein a radial extent of the boss portion is greater than a diameter of the through-opening and at least 50% of a diameter of the piston; and wherein the radial extent of the boss portion is greater than a diameter of a combustion chamber recess of the piston.

9. The internal combustion engine as claimed in claim 8, wherein the at least one intermediate portion includes two intermediate portions extending between the respective boss portion and the skirt walls.

10. The internal combustion engine as claimed in claim 8, wherein the at least one intermediate portion of one of the two box walls and the at least one intermediate portion of the other of the two box walls are spaced a greater distance apart at the associated skirt wall than at the respective bend.

11. The internal combustion engine as claimed in claim 8, wherein the at least one intermediate portion of one of the two box walls and the at least one intermediate portion of the other of the two box walls are spaced a smaller distance apart at the associated skirt wall than at the respective bend.

12. The internal combustion engine as claimed in claim 8, wherein a bend angle between the boss portion and an intermediate portion is between 10° and 20°.

13. The internal combustion engine as claimed in claim 8, wherein a bend angle a between the boss portion and the at least one intermediate portion is approximately 15°.

14. The internal combustion engine as claimed in claim 8, the radial extent of the boss portion is at least 60% of the diameter of the piston.

15. A piston comprising:

a piston head;

a piston skirt extending in a piston longitudinal direction and defined in the piston longitudinal direction by the piston head;

wherein the piston skirt includes two box walls and two substantially opposing skirt walls defining a boxed interior space;

wherein the two box walls each has a through-opening is arranged thereon, the two through-openings being aligned with one another;

wherein the two box walls each includes a boss portion oriented perpendicularly to the boss, and two intermediate portions each extending between the respective boss portion and one of the skirt walls and merging via a bend into the respective boss portion;

wherein a radial extent of the boss portion is greater than a diameter of the through-opening and at least 60% of a diameter of the piston;

wherein a bend angle between the boss portion and each of the intermediate portions is between 10° and 20°; and wherein the radial extent of the boss portion is greater than a diameter of a combustion chamber recess of the piston.

16. The piston as claimed in claim 15, wherein the two intermediate portions are spaced a greater distance apart at the associated skirt wall than at the respective bend.

17. The piston as claimed in claim 15, wherein the two intermediate portions are spaced a smaller distance apart at the associated skirt wall than at the respective bend.

18. The piston as claim in claim 1, wherein the at least one intermediate portion of each box wall includes only one intermediate portion.

* * * * *